United States Patent
Zhao et al.

(10) Patent No.: US 11,134,257 B2
(45) Date of Patent: Sep. 28, 2021

(54) SIMPLIFIED SIGNALING METHOD FOR AFFINE LINEAR WEIGHTED INTRA PREDICTION MODE

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/822,985

(22) Filed: Mar. 18, 2020

(65) Prior Publication Data

US 2020/0322620 A1    Oct. 8, 2020

Related U.S. Application Data

(60) Provisional application No. 62/829,439, filed on Apr. 4, 2019.

(51) Int. Cl.
| | |
|---|---|
| *H04N 19/44* | (2014.01) |
| *H04N 19/105* | (2014.01) |
| *H04N 19/176* | (2014.01) |
| *H04N 19/186* | (2014.01) |
| *H04N 19/159* | (2014.01) |
| *H04N 19/11* | (2014.01) |
| *H04N 19/119* | (2014.01) |
| *H04N 19/46* | (2014.01) |

(52) U.S. Cl.
CPC .......... *H04N 19/44* (2014.11); *H04N 19/105* (2014.11); *H04N 19/11* (2014.11); *H04N 19/159* (2014.11); *H04N 19/176* (2014.11); *H04N 19/186* (2014.11); *H04N 19/119* (2014.11); *H04N 19/46* (2014.11)

(58) Field of Classification Search
None
See application file for complete search history.

(56) References Cited

U.S. PATENT DOCUMENTS

| | | |
|---|---|---|
| 9,363,511 B2 | 6/2016 | Zhang et al. |
| 9,769,472 B2 | 9/2017 | Liu et al. |
| | (Continued) | |

OTHER PUBLICATIONS

Pfaff et al. "CE3: Affine linear weighted intra prediction (CE3-4.1, CE3-4.2)" JVET-N0217 Mar. 12, 2019 (Year: 2019).*

(Continued)

*Primary Examiner* — Stefan Gadomski
(74) *Attorney, Agent, or Firm* — Oblon, McClelland, Maier & Neustadt, L.L.P.

(57) ABSTRACT

Aspects of the disclosure include methods and apparatuses for video encoding/decoding. In a method for video decoding in a decoder, prediction information for a current block in a current picture that is a part of a coded video sequence is decoded. The prediction information indicates whether the current block is coded in matrix based intra prediction (MIP). Responsive to the prediction information indicating that the current block is coded in MIP, an MIP mode index is determined. The MIP mode index indicates one of a plurality of MIP modes. The current block is reconstructed according to the one of the plurality of MIP modes.

20 Claims, 15 Drawing Sheets

(56) References Cited

U.S. PATENT DOCUMENTS

| | | | |
|---|---|---|---|
| 2017/0332084 A1* | 11/2017 | Seregin | H04N 19/159 |
| 2017/0347103 A1* | 11/2017 | Yu | H04N 19/1883 |
| 2018/0098063 A1* | 4/2018 | Chen | H04N 19/139 |
| 2019/0045184 A1* | 2/2019 | Zhang | H04N 19/593 |
| 2019/0306513 A1* | 10/2019 | Van der Auwera | H04N 19/176 |
| 2020/0014922 A1* | 1/2020 | Ramasubramonian | H04N 19/593 |
| 2020/0322623 A1* | 10/2020 | Chiang | H04N 19/105 |
| 2021/0105464 A1* | 4/2021 | Choi | H04N 19/117 |

OTHER PUBLICATIONS

Helle et al. "CE3: Non-linear weighted intra prediction (tests 2.2.1 and 2.2.2)" JVET-L0199 Oct. 2018 (Year: 2018).*

Helle et al. "CE3-related: Non-linear weighted intra prediction (cross-check report in JVET-K0262)" JVET-K0196 Jul. 2018 (Year: 2018).*

Zhang et al., "Intra mode coding with fixed length binarization," JCTVC-H0435, 8th Meeting: San Jose, Nov. 21-30, 2011 (5 pages).

Zhang et al., "Non-CE6: Intra mode coding with fixed length binarization," JCTVC-H0435, 8th Meeting: San Jose, Feb. 1-10, 2012 (5 pages).

Bross et al., "Versatile Video Coding (Draft 4)," JVET-M1001, 13th Meeting: Marrakech, MA, Jan. 9-18, 2019 (299 pages).

High Efficiency Video Coding (HEVC), Rec. ITU-T H.265, International Telecommunication Union, Apr. 2015. (634 pages).

* cited by examiner

| Chroma prediction mode | Corresponding luma intra prediction mode | | | | X (0 ≤ X ≤ 66) |
|---|---|---|---|---|---|
| | 0 | 50 | 18 | 1 | X |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

FIG. 11

SIMPLIFIED SIGNALING METHOD FOR AFFINE LINEAR WEIGHTED INTRA PREDICTION MODE

INCORPORATION BY REFERENCE

This present application claims the benefit of priority to U.S. Provisional Application No. 62/829,439, "SIMPLIFIED SIGNALING METHOD FOR AMINE LINEAR WEIGHTED INTRA PREDICTION MODE" filed on Apr. 4, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through ultra prediction, and so can the entropy coding technology used to translate the codewords into a bitstream.

A certain mode of intra prediction was introduced with H.264, refined in H.265, and further refined in newer coding technologies such as joint exploration model (TEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes processing circuitry.

According to aspects of the disclosure, there is provided a method for video decoding in a decoder. In the method, the processing circuitry decodes prediction information for a current block in a current picture that is a part of a coded video sequence. The prediction information indicates whether the current block is coded in affine linear weighted intra prediction (ALWIP). Responsive to the prediction information indicating that the current block is coded in ALWIP, the processing circuitry determines an ALWIP mode index irrespective of prediction modes of neighboring blocks adjacent to the current block, the ALWIP mode index indicating one of a plurality of ALWIP modes. The processing circuitry reconstructs the current block according to the one of the plurality of ALWIP modes.

In an embodiment, the ALWIP mode index is one of a truncated binary codeword, a fixed length codeword, and a truncated unary codeword.

In an embodiment, responsive to the prediction information indicating that the current block is coded in ALWIP, the processing circuitry constructs a mode candidate list including at least one fixed mode candidate. The at least one fixed mode candidate is a predetermined subset of the plurality of ALWIP modes.

In an embodiment, a total number of the plurality of ALWIP modes is a power of 2.

According to aspects of the disclosure, responsive to the prediction information indicating that the current block is not coded in ALWIP, the processing circuitry determines whether one of the neighboring blocks is coded in ALWIP. Responsive to the one of the neighboring blocks being coded in ALWIP, the processing circuitry constructs the mode candidate list based on one of (i) a preset intra prediction mode and (ii) an intra prediction mode of another neighboring block of the neighboring blocks.

In an embodiment, the preset prediction mode is one of a Planar intra prediction mode, a DC intra prediction mode, a Horizontal intra prediction mode, and a Vertical intra prediction mode.

In an embodiment, the processing circuitry sets the one of the neighboring blocks as unavailable responsive to the one of the neighboring blocks being coded in ALWIP.

In an embodiment, responsive to the prediction information indicating that the current block is coded in ALWIP and a derived mode being used for an associated chroma block of the current block, the processing circuitry sets a prediction mode of the associated chroma block to be a preset intra prediction mode.

According to aspects of the disclosure, there is provided another method for video decoding in a decoder. In the method, the processing circuitry decodes prediction information for a current block in a current picture that is a part of a coded video sequence. The prediction information indicates that the current block is coded in affine linear weighted intra prediction (ALWIP). The processing circuitry determines whether a neighboring block adjacent to the current block is coded in ALWIP. Responsive to the neighboring block not being coded in ALWIP, the processing circuitry constructs a mode candidate list based on one of (i) a preset ALWIP mode and (ii) an ALWIP mode of another neighboring block. The processing circuitry reconstructs the current block based on the mode candidate list.

In an embodiment, the processing circuitry sets the neighboring block as unavailable responsive to the neighboring block not being coded in ALWIP.

In an embodiment, the neighboring block is adjacent to a top-right corner or a bottom-left corner of the current block.

In an embodiment, a size of the mode candidate list is based on coded information of the neighboring block included in the coded video sequence.

In an embodiment, the prediction information indicates that a chroma block of the current block is associated with multiple luma blocks, and the processing circuitry determines whether a luma block of the multiple luma blocks is coded in a non-ALWIP intra prediction mode. Responsive to the luma block being coded in the non-ALWIP intra prediction mode, the processing circuitry determines a prediction mode of the chroma block of the current block to be the non-ALWIP intra prediction mode of the luma block.

In an embodiment, the prediction information indicates that a chroma block of the current block is associated with multiple luma blocks, and the processing circuitry determines whether a luma block of the multiple luma blocks is coded in a non-ALWIP intra prediction mode. Responsive to each of the multiple luma blocks being coded in ALWIP, the processing circuitry determines the prediction mode of the chroma block of the current block to be a preset intra prediction mode.

Aspects of the disclosure also provide one or more non-transitory computer-readable mediums storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 11 shows a table that illustrates an exemplary intra mode coding of a chroma block in some examples;

DETAILED DESCRIPTION OF EMBODIMENTS

Video Encoder and Decoder

Figure 1:
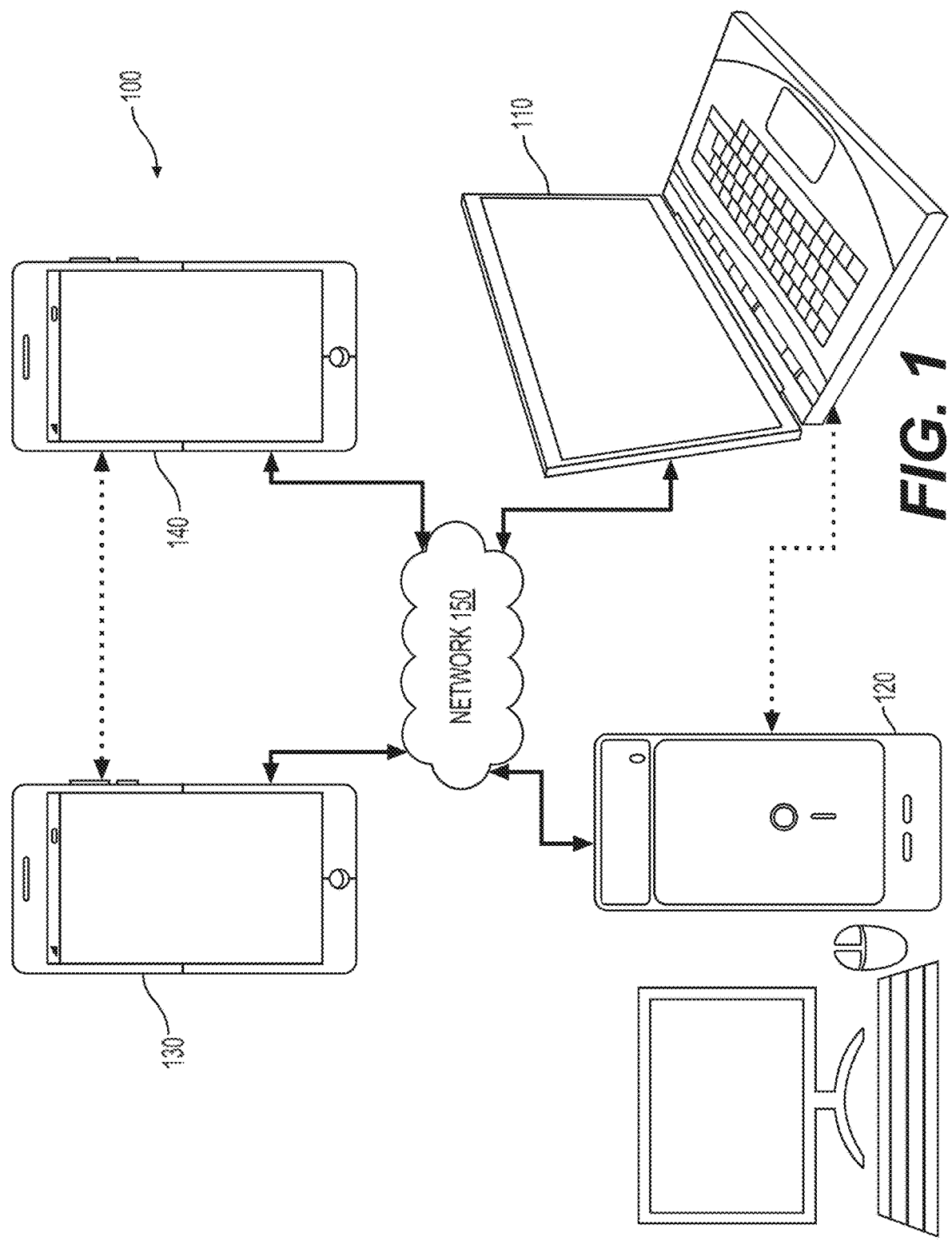
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
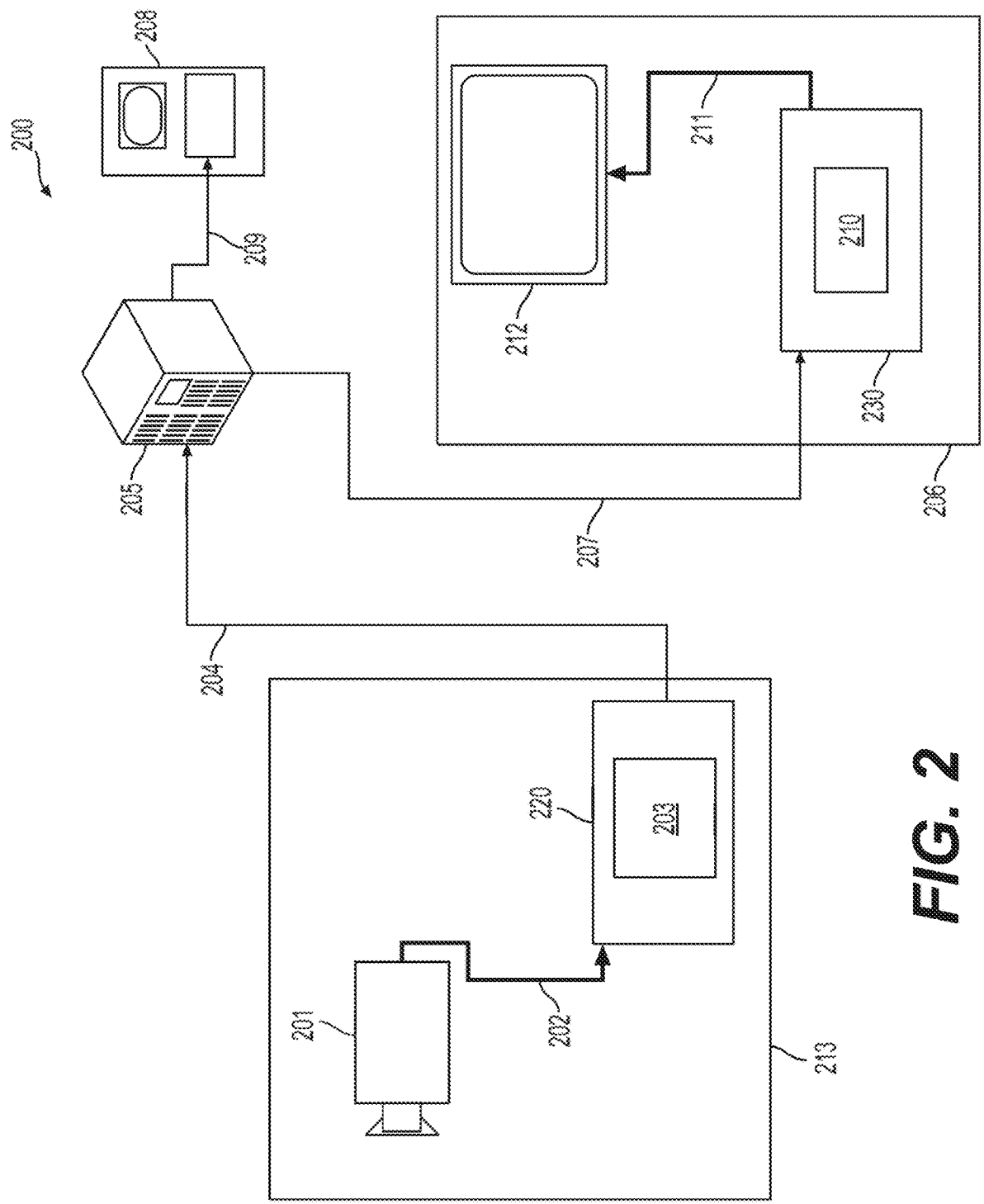
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213) that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
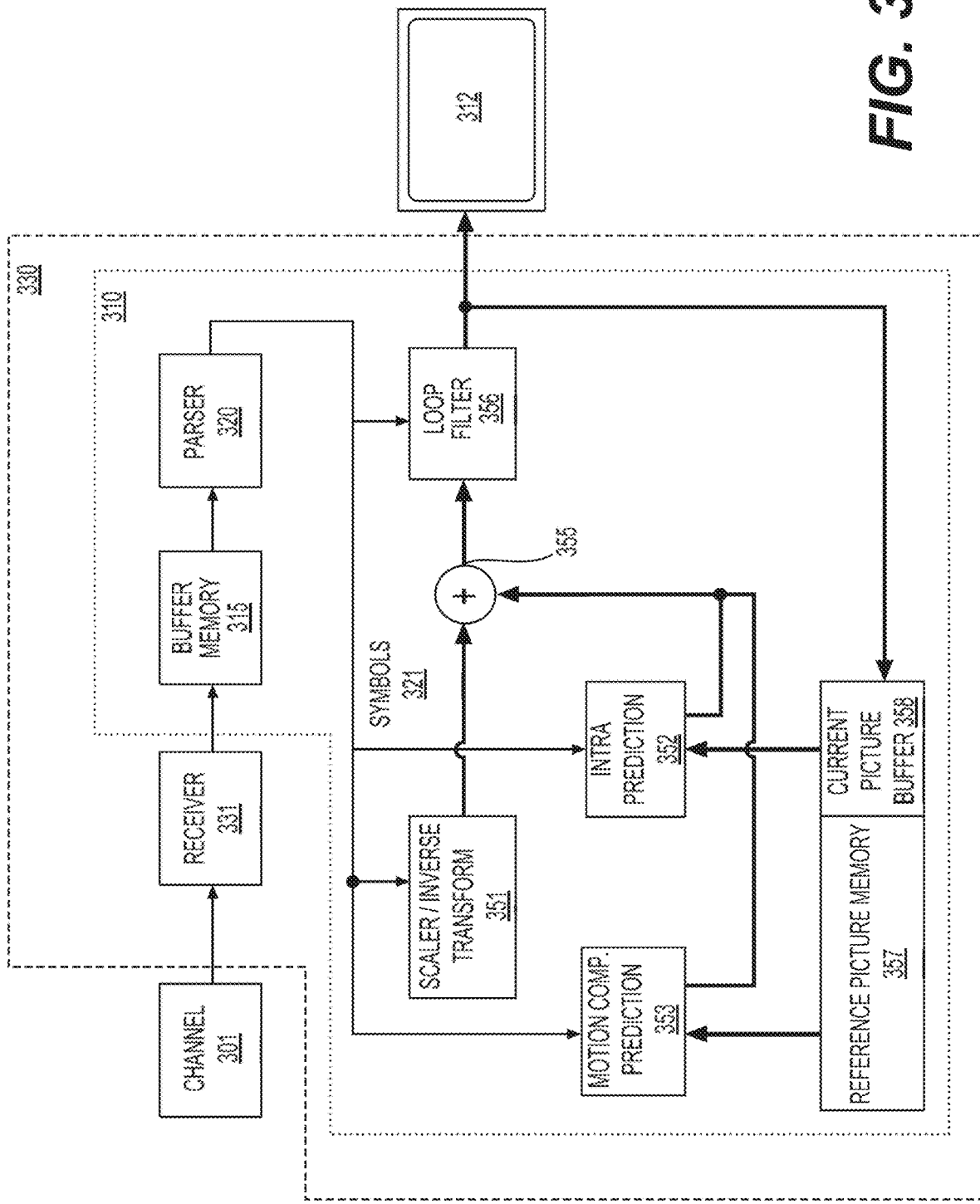
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle play out timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD)

specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of; for example, temporal, spatial, or signal noise ratio (SNR) enhancement layers, redundant slices, redundant pictures, forward error correction codes, and so on.

Figure 4:
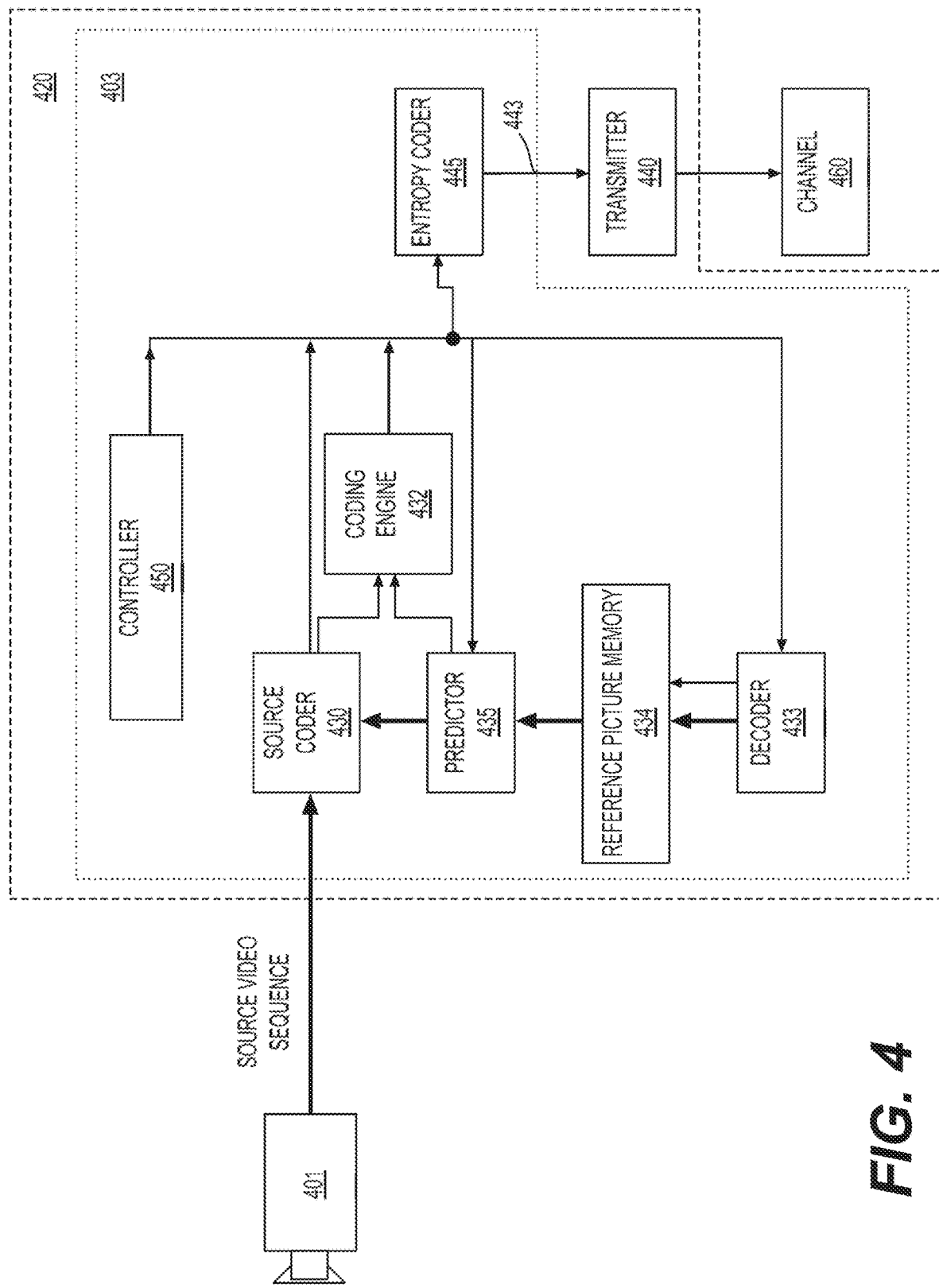
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable hit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture front the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by losslessly compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
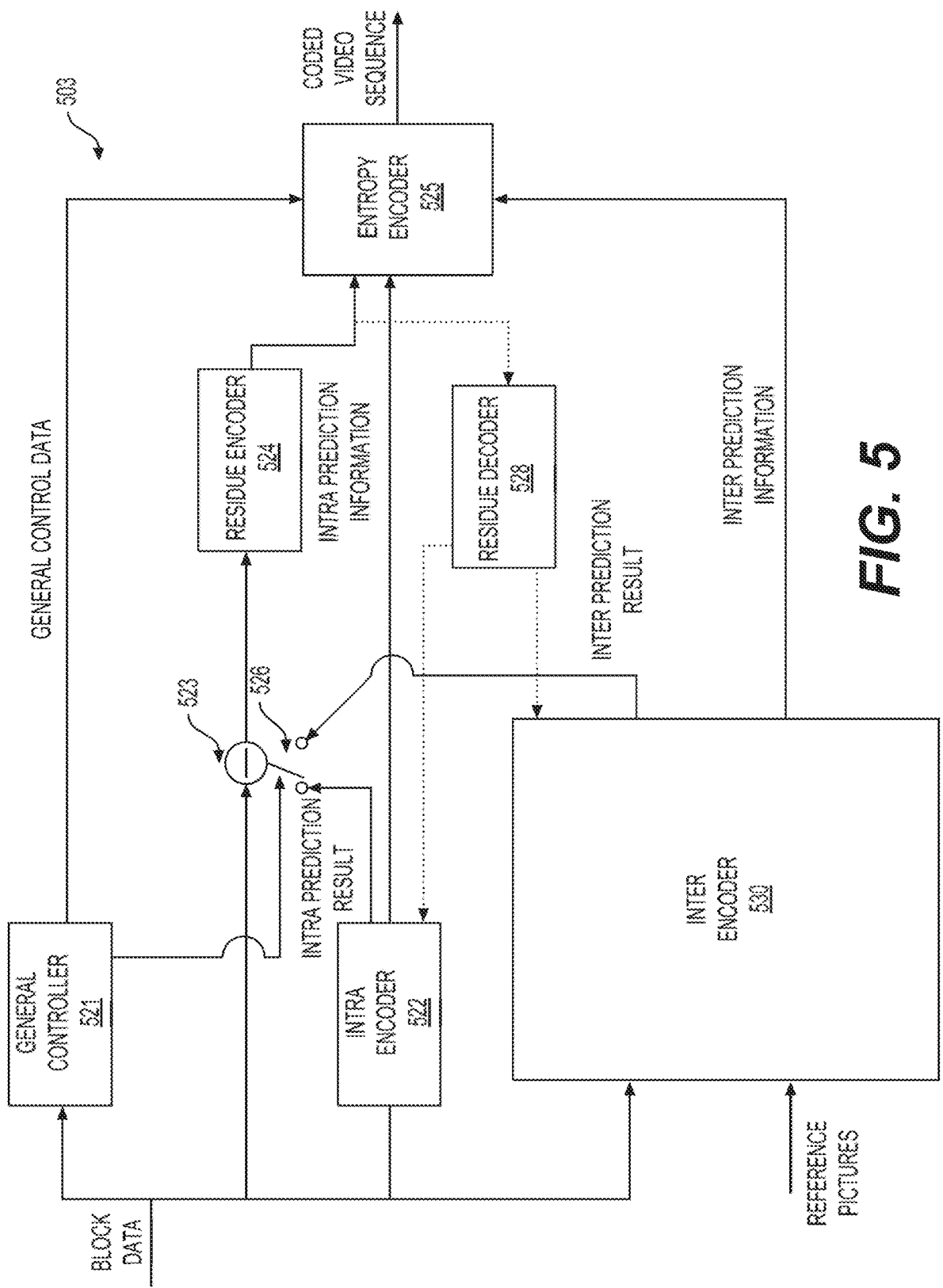
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
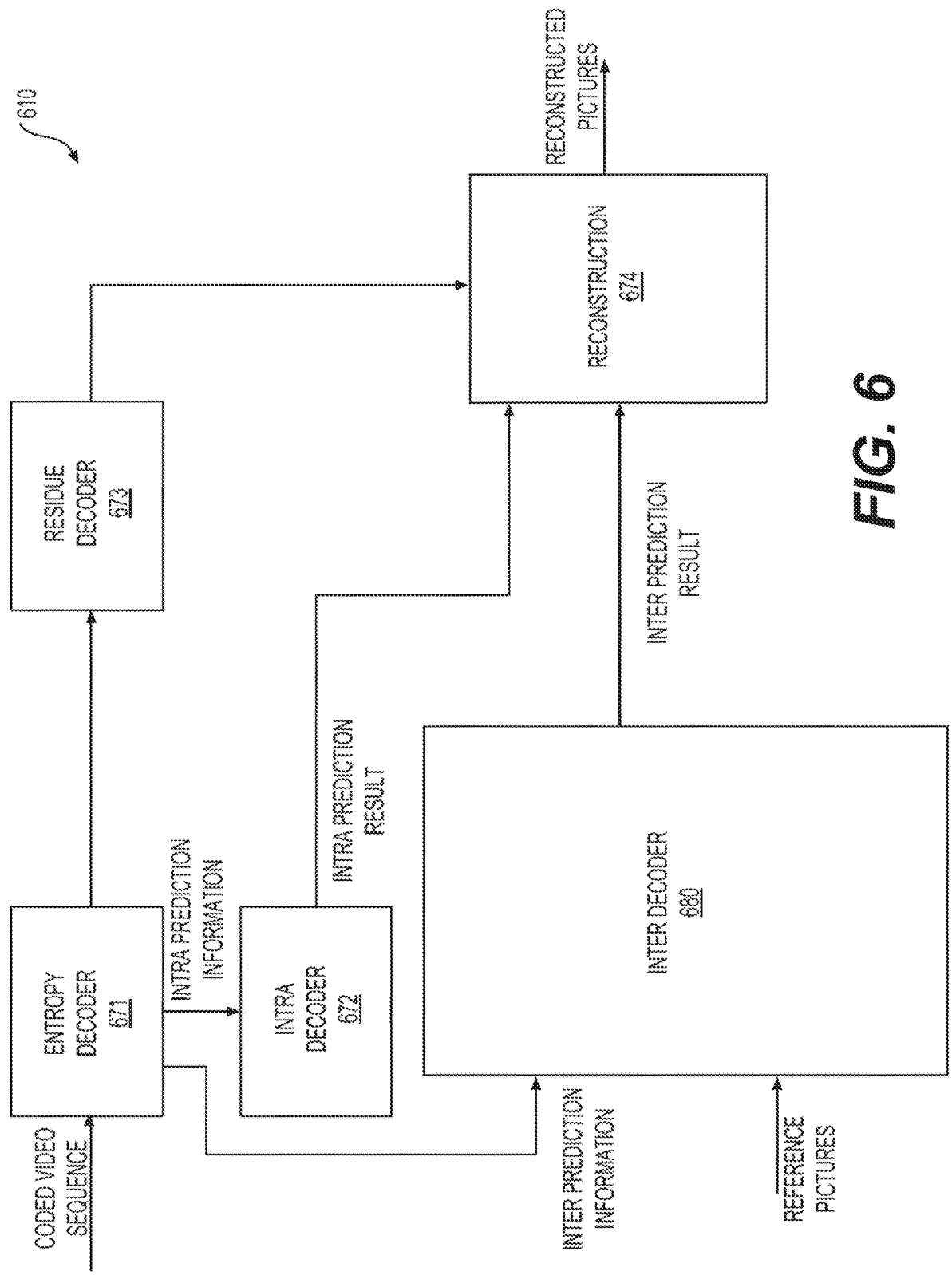
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Intra Prediction in HEVC and VVC

In the following description, the term block can be interpreted as a prediction block, a coding block, or a coding unit.

Figure 7:
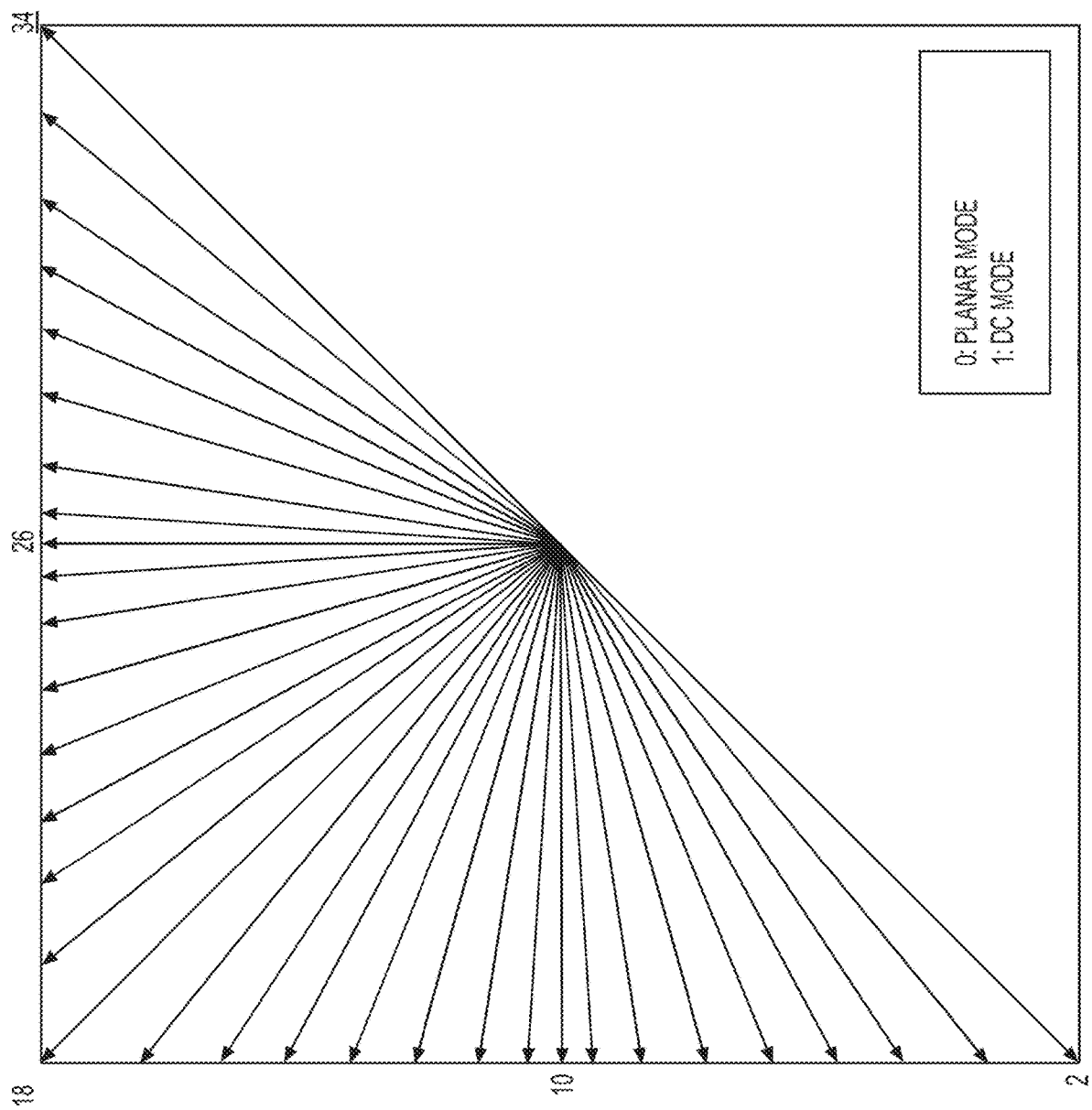
FIG. 7 shows an illustration of exemplary intra prediction directions and the intra prediction modes in some examples.

FIG. 7 shows an illustration of exemplary ultra prediction directions and corresponding intra prediction modes in some examples (e.g., in HEVC). In FIG. 7, there are a total of 35 intra prediction modes (mode 0 to mode 34). The mode 0 and mode 1 are non-directional modes, among which mode 0 is planar mode (Intra_Planar) and mode 1 is DC mode (Intra_DC). The modes 2-34 are directional (or angular) modes (Intra_Angular), among which mode 10 is a horizontal mode, mode 26 is a vertical mode, and mode 2, mode 18 and mode 34 are diagonal modes.

In some examples, to code an intra mode, a subset of the intra prediction modes forms a mode candidate list. For example, one or more most probable modes forms a mode candidate list that is referred to the MPM list. In an example (e.g., HEVC), an MPM list includes three most probable modes and is constructed based on intra prediction mode(s) of neighboring block(s) of a current block. The MPM list is also referred to as primary MPM list. In such an example, an MPM flag is signaled to indicate whether an intra prediction mode of the current block is from the MPM list. If the MPM flag indicates that the intra prediction mode of the current block is from the MPM list, an MPM list index is signaled to indicate one of the three most probable modes in the MPM list for the current block. However, if the MPM flag indicates that the intra prediction mode of the current block is not from the MPM list, a mode index is signaled to indicate one of the other 32 intra modes for the current block.

In some examples, an MPM list generation process is shown as follows.
If (leftIntraDir==aboveIntraDir && leftIntradir>DC_IDX)
   MPM [0]=leftIntraDir;
   MPM [1]=((leftIntraDir+offset) % mod)°2;
   MPM [2]=((leftIntraDir−1) % mod)+2;
Else if (leftIntraDir==aboveIntraDir)
   MPM [0]=PLANAR_IDX;
   MPM [1]=DC_IDX;
   MPM [2]=VER_IDX;
Else if (leftIntraDir!=aboveIntraDir)
   MPM [0]=leftIntraDir;
   MPM [1]=aboveIntraDir;
   If (leftIntraDir>0 && aboveIntraDir>0)
     MPM [2]=PLANAR_IDX;
   Else
     MPM [2]=(leftIntraDir+aboveIntraDir)<2?VER_IDX: DC_IDX In the MPM list generation process, leftIntraDir indicates an intra prediction mode of a neighboring block to the left of a current block (referred to as a left neighboring block), and aboveIntraDir indicates an intra prediction mode of a neighboring block above the current block (referred to as an above neighboring block). If the left neighboring block or above neighboring block is not available, leftIntraDir or aboveIntraDir can be set to DC_IDX. PLANAR_IDX, DC_IDX, and VER_IDX indicate mode indices of planar mode (e.g., mode 0), DC mode (e.g., mode 1), and vertical mode (e.g., mode 26), respectively. In addition, variables "offset" and "mod" are constant values, which are set to 29 and 32 respectively in an example. In such an example, when both the left neighboring block and the above neighboring block have a same directional mode, the first most probable mode is set to the same directional mode. The second and third most probable modes are chosen as two directional modes that are closest to the mode number of the first most probable mode. When both the left neighboring block and the above neighboring block have a same non-directional mode, the first, second, and third most probable modes are set to planar mode, DC mode, and vertical mode, respectively. When the left neighboring block and the above neighboring block have different intra prediction modes, the first and second most probable modes are set to the intra prediction modes of the left neighboring block and the above neighboring block respectively, and the third most probable mode is set to one of planar mode, DC mode, or vertical mode, according to which of these modes, in this order, is not a duplicate of one of the first two most probable modes.

Figure 8:
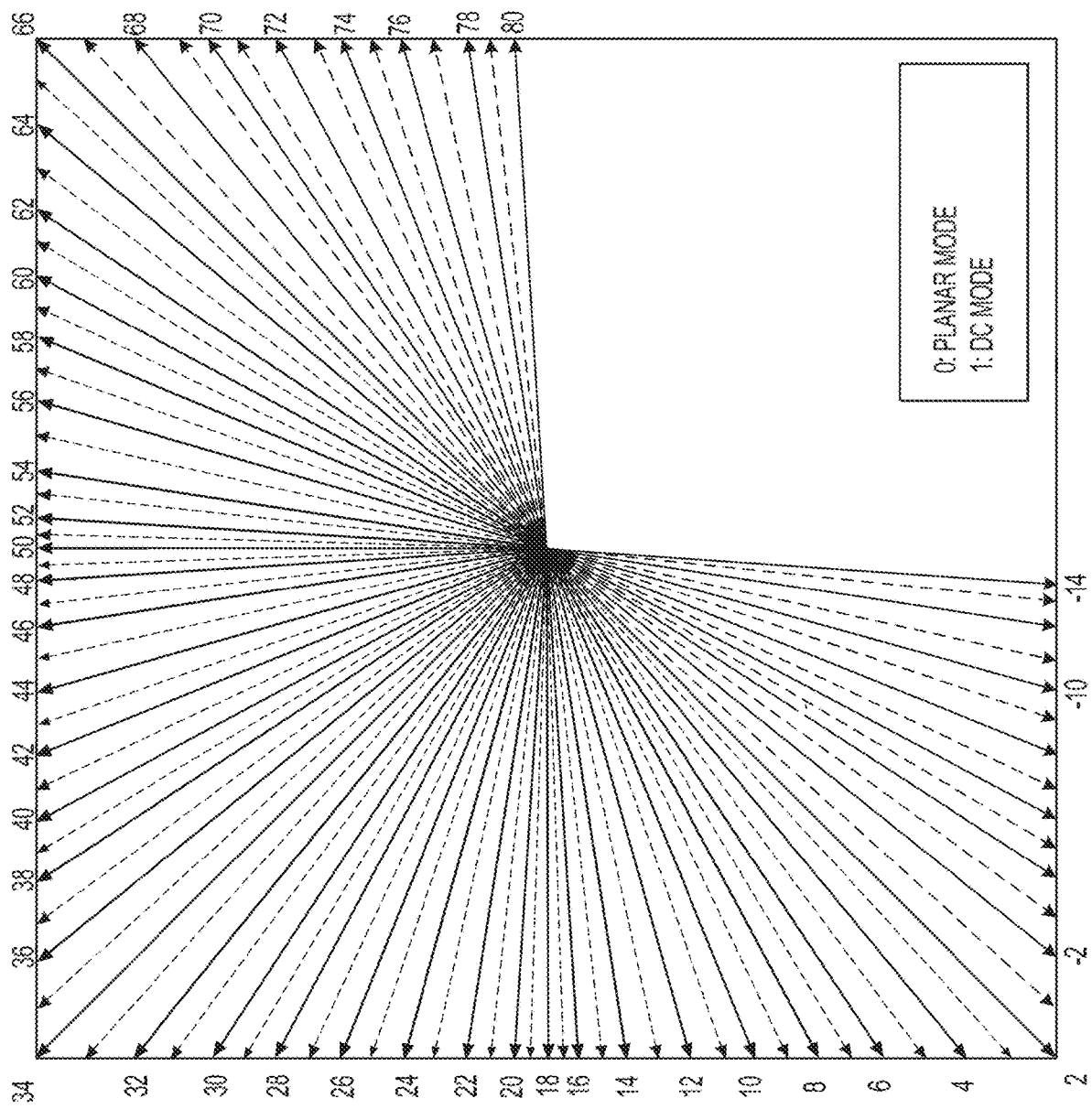
FIG. 8 shows an illustration of exemplary intra prediction directions and intra prediction modes in some examples.

FIG. 8 shows an illustration of exemplary ultra prediction directions and corresponding intra prediction modes in some examples (e.g., VVC). In FIG. 8, there are a total of 95 intra prediction modes (mode −14 to mode 80), among which mode 18 is a horizontal mode, mode 50 is a vertical mode, and mode 2, mode 34, and mode 66 are diagonal modes. Modes −1~−14 and Modes 67~80 are referred to as wide-angle intra prediction (WAIP) modes.

Similar to the FIG. 7 example, an MPM list is constructed for mode coding in the FIG. 8 example. For example, in a multi-line intra prediction, a size of the MPM list is set to 6 for an adjacent reference line and 5 for non-adjacent reference lines of a current block. The adjacent reference line and non-adjacent reference lines will be described with reference to FIG. 9.

Figure 9:
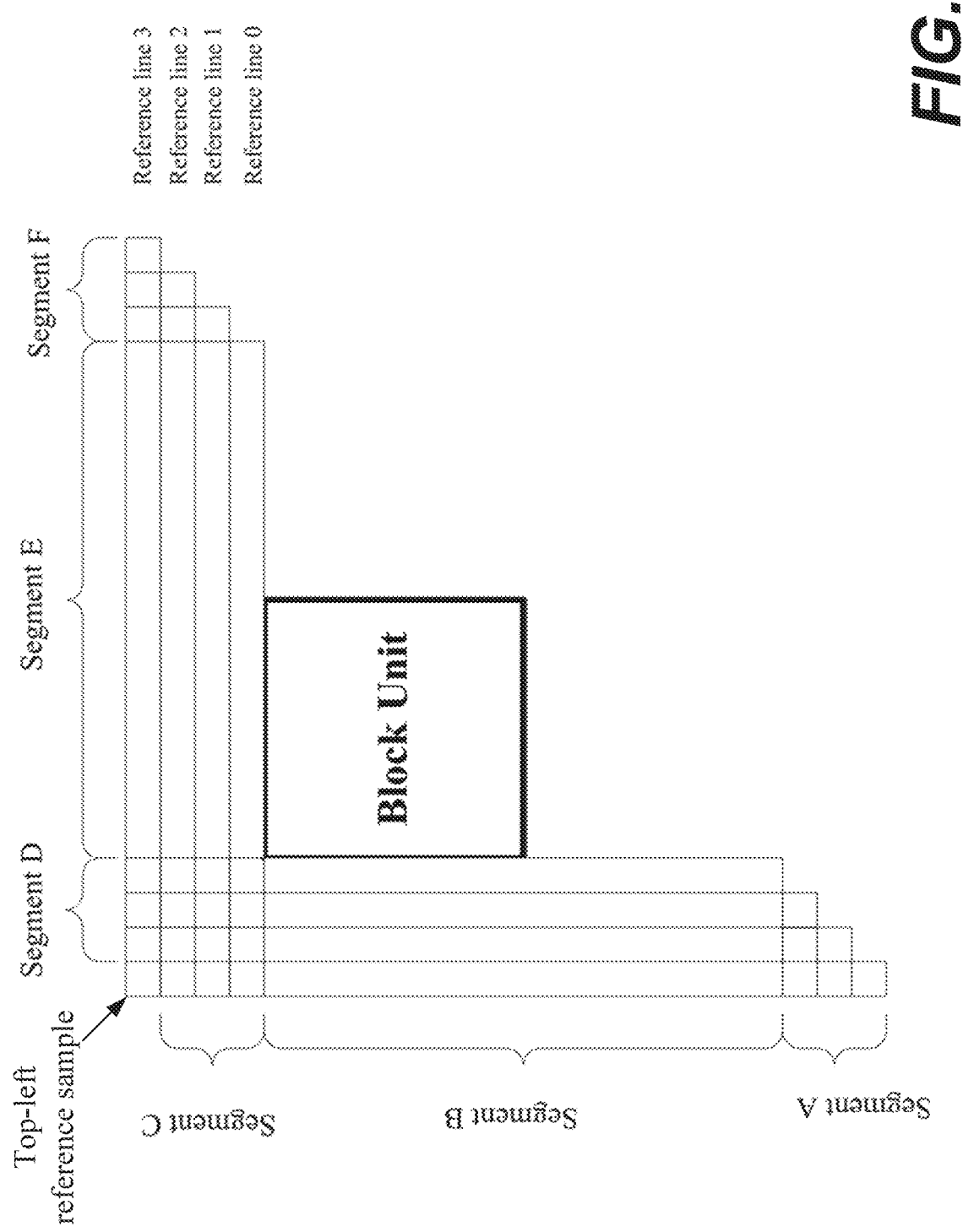
FIG. 9 shows an exemplary multi-line intra prediction in some examples.

FIG. 9 shows an exemplary multi-line intra prediction in some examples (e.g., VVC). In the multi-line intra prediction, multiple reference lines are employed for intra prediction. In the FIG. 9 example, there are four reference lines, i.e., reference lines 0-3, where reference line 0 is the adjacent reference line and also referred to as zero reference line, and reference lines 1-3 are the non-adjacent reference lines and also referred to as non-zero reference lines. Each reference line includes a vertical part and a horizontal part, and is composed of six segments, i.e., Segments A to F. Segments A and F are padded with the closest samples from Segments B and B, respectively. In addition, a top-left reference sample is included between Segments C and D in the FIG. 9 example. A reference line index is signaled before intra prediction modes to indicate one of the multiple reference lines to be used. In a case that a non-zero reference line index is signaled, only the most probable modes are permitted to be used for intra prediction.

Figure 10:
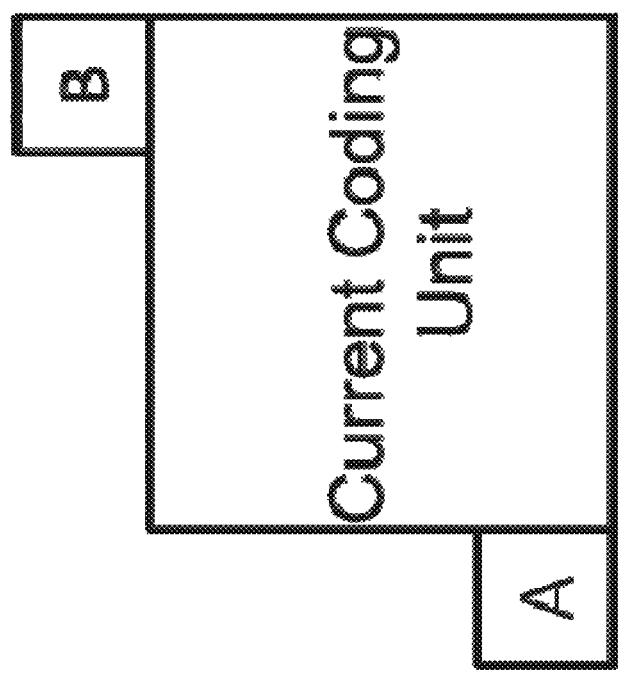
FIG. 10 shows exemplary positions of neighboring blocks used to derive a most probable mode (MPM) list for a current block in some examples.

FIG. 10 shows exemplary positions of neighboring blocks used to derive an MPM list for a current block in some examples (e.g., VVC). The block A and block B denote a left and an above neighboring coding unit (CU) of a current CU, respectively. The block A is adjacent to a bottom-left corner of the current CU, and the block B is adjacent to a top-right corner of the current CU. Variables "candIntraPredModeA." and "candIntraPredModeB" indicate intra prediction modes of the blocks A and B, respectively, and are initially set to Intra_Planar. If the block A (or B) is marked as available, candIntraPredModeA (or candIntraPredModelB) is set to the actual intra prediction mode of the block A (or B). In some examples, the positions of neighboring blocks used to derive MPM candidates are the same for the adjacent and non-adjacent reference lines in a multi-line intra prediction.

FIG. 11 shows a table that illustrates an exemplary intra mode coding of a chroma block in some examples (e.g., VVC). In FIG. 11, there are 8 intra modes for the intra mode coding of the chroma block: planar mode, vertical mode, horizontal mode, DC mode, derived mode, and three cross-component linear model modes (CCLM, LM_A, and LM_L). As shown in the table, the intra mode coding of the chroma block can depend (e.g., directly depend) on the intra prediction mode of the corresponding luma block, Since chroma component and luma component may use different block partitioning structures, for example, in an I slice, one chroma block may correspond to multiple luma blocks. Accordingly, when derived mode is used for intra mode coding of the chroma block, the intra prediction mode of the corresponding luma block covering the center position of the chroma block is directly inherited to be the intra prediction mode of the chroma block.

Figure 12:
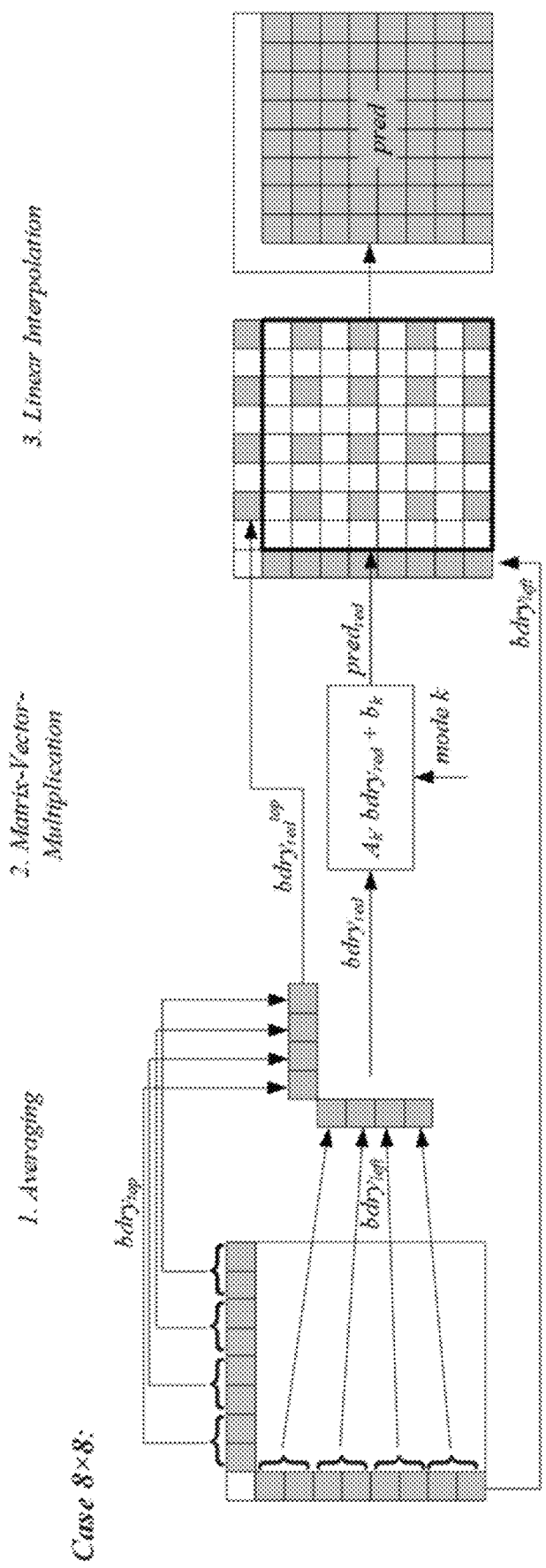
FIG. 12 shows an exemplary affine linear weighted intra prediction (ALWIP) in some examples.

FIG. 12 shows an exemplary affine linear weighted intra prediction (ALWIP) in some examples (e.g., VVC). For predicting samples of a prediction block (PB) with a width W and a height H, one left column of H reconstructed neighboring boundary samples of the PB and one above row of W reconstructed neighboring boundary samples of the PB are taken as input in ALWIP. If the reconstructed neighboring boundary samples are unavailable, they can be generated by using other intra prediction methods. ALWIP can be also referred to as matrix based intra prediction (MIP).

In an example, the PB can be predicted based on the following three steps.

(1) A first plurality of averaged samples is extracted by averaging (e.g., subsets of) the left column of neighboring boundary samples of the PB, and a second plurality of averaged samples is extracted by averaging (e.g., subsets of) the above row of neighboring boundary samples of the PB. In the case that W=H=4 samples, a total number of the first plurality and the second plurality of averaged samples is four. In other cases, a total of eight averaged samples are extracted.

(2) The averaged samples are multiplied by a matrix vector. An offset is added to the result of the multiplication to generate a reduced PB on a subsampled set of samples in the original PB.

(3) The prediction samples at the remaining positions are generated from the reduced PB on the subsampled set by applying linear interpolation to the reduced PB on the subsampled set in each direction.

The matrices and offset vectors used to generate the reduced PB can be taken from three sets of matrices ($S_0$, $S_1$, and $S_2$). The matrix set $S_0$ consists of, or includes, 18 matrices $A_0^i$, $i \in \{0, \ldots, 17\}$. Each matrix can have 16 rows and 4 columns as well as 18 offset vectors $b_0^i$, $i \in \{0, \ldots, 17\}$. Each offset vector can have a size of 16. The matrices and offset vectors included in the matrix set $S_0$ can be used for blocks with a size of 4×4. The matrix set $S_1$ consists of, or includes, 10 matrices $A_1^i$, $i \in \{0, \ldots, 9\}$. Each matrix can have 16 rows and 8 columns as well as 10 offset vectors $b_1^i$, $i \in \{0, \ldots, 9\}$. Each offset vector can have a size of 16. The matrices and offset vectors included in the matrix set $S_1$ can be used for blocks with sizes of 4×8, 8×4, and 8×8. The matrix set $S_2$ consists of, or includes, 6 matrices $A_2^i$, $i \in \{0, \ldots, 5\}$. Each matrix can have 64 rows and 8 columns as well as 6 offset vectors $b_2^i$, $i \in \{0, \ldots, 5\}$. Each offset vector can have a size of 64. The matrices and offset vectors included in the matrix set $S_2$ can be used for blocks with all other shapes and sizes.

Given an 8×8 block as shown in FIG. 12, ALWIP takes four averages along the vertical boundary and four averages along the horizontal boundary. The resulting eight averages are input into the matrix vector multiplication. The matrices are taken from the matrix set $S_1$ because of the block size. The matrix vector multiplication yields 16 samples on the odd positions of the block. Thus, a total of (8×16)/(8×8)=2 multiplications per sample are performed. After adding an offset, these samples are vertically interpolated by using the reduced top boundary samples, and then horizontally interpolated by using the original left boundary samples. The interpolation process does not require any multiplications in this case.

MPM List Derivation for ALWIP Intra Prediction Modes

According to aspects of the disclosure, a non-ALWIP mode can be mapped to an ALWIP mode according to a mapping table. The mapping table can be varied based on the block size. In one embodiment, there are three mapping tables map_angular_to_alwip$_{idx}$, idx$\in\{0,1,2\}$, and each mapping table corresponds to a respective matrix set (one of $S_0$-$S_2$) and associates a non-ALWIP intra prediction mode predmode$_{Angular}$ with a specific ALWIP mode, as described in the Eq. 1.

$$\text{predmode}_{ALWIP} = \text{map\_angular\_to\_alwip}_{idx}[\text{predmode}_{Angular}] \qquad \text{Eq. 1}$$

The index idx of the mapping table indicates one of the three matrix sets that the ALWIP parameters are to be taken from. The index can be decided based on a width W and a height H of a prediction unit (PU) and can be determined according to Eq. 2 and Eq. 3.

$$idx(PU) = idx(W, H) \in \{0, 1, 2\} \qquad \text{Eq. 2}$$

$$idx(W, H) = \begin{cases} 0 & \text{for } W = H = 4 \\ 1 & \text{for } \max(W, H) = 8 \\ 2 & \text{for } \max(W, H) > 8 \end{cases} \qquad \text{Eq. 3}$$

According to aspects of the disclosure, for each CU in intra mode, a flag indicating whether ALWIP is applied on a corresponding FU is sent in the bitstream. When the flag indicates ALWIP is to be applied, an index predmode of an ALWIP mode is signaled to indicate a mode candidate in an MPM list. In an example, the MPM list includes 3 MPM candidates.

To generate an MPM list for a current block that is coded by ALWIP, an above ALWIP mode $mode_{ALWIP}^{above}$ and a left ALWIP mode $mode_{ALWIP}^{left}$ can be derived as follows.

When an above PU $PU_{above}$ of a current PU is available and belongs to the same CTU where the current PU resides, and $PU_{above}$ is coded using an ALWIP mode $predmode_{ALWIP}^{above}$ and $idx(PU)=idx(PU_{above})$, the above ALWIP mode can be determined according to Eq. 4.

$$mode_{ALWIP}^{above} = predmode_{ALWIP}^{above} \qquad \text{Eq. 4}$$

When the above PU $PU_{above}$ is available and belongs to the same CTU where the current PU resides, and $PU_{above}$ is coded using a non-ALWIP intra prediction mode $predmode_{Angular}^{above}$, the above ALWIP mode can be determined using a mapping table according to Eq. 5.

$$mode_{ALWIP}^{above} = \text{map\_angular\_to\_alwip}_{idx(PU_{above})}[predmode_{Angular}^{above}] \qquad \text{Eq. 5}$$

In other cases, the above ALWIP mode can be set to unavailable according to Eq. 6.

$$mode_{ALWIP}^{above} = -1 \qquad \text{Eq. 6}$$

The value of $mode_{ALWIP}^{left}$ can be derived in the same way as deriving $mode_{ALWIP}^{above}$ but without checking whether the left PU belongs to the same CTU where the current PU resides.

Therefore, an MPM list is constructed based on the derived $mode_{ALWIP}^{above}$ and $mode_{ALWIP}^{left}$ as well as three pre-defined fixed default MPM lists $list_{idx}$, $idx \in \{0,1,2\}$. Each pre-defined fixed default MPM list consists of, or includes, three distinct ALWIP modes. In an example, the unavailable mode −1 is substituted by a default value and duplicate ALWIP modes are removed.

WPM List Derivation for Non-ALWIP Intra Prediction Modes

According to aspects of the disclosure, an ALWIP mode can be mapped to a non-ALWIP mode according to a mapping table. The mapping table can be varied based on the block size. There are three mapping tables $map\_alwip\_to\_angular_{idx}$, $idx \in \{0,1,2\}$. Each mapping table corresponds to a respective matrix set (one of $S_0$-$S_2$) and associates an ALWIP intra prediction mode $predmode_{ALWIP}$ with a specific non-ALWIP intra prediction mode, as described in Eq. 7.

$$predmode_{Angular} = \text{map\_alwip\_to\_angular}_{idx(PU)}[predmode_{ALWIP}] \qquad \text{Eq. 7}$$

For MPM list derivation of a luma block, when a neighboring block of the luma block is coded by an ALWIP mode, one of the three mapping tables can be used to map the ALWIP mode to a corresponding non-ALWIP intra prediction mode. For MPM list derivation of a chroma block, when an associated luma block of the chroma block is coded by an ALWIP-mode, the same mapping is used to translate the ALWIP mode to a non-ALWIP intra prediction mode.

In the above examples, to signal an ALWIP mode, an MPM list is constructed. The construction of the MPM list includes checking prediction mode(s) of neighboring block(s). When the prediction mode of the neighboring block is not an ALWIP mode, the prediction mode of the neighboring block is to be mapped to an ALWIP mode by using a mapping table. When the prediction mode of the neighboring block is an ALWIP mode, the width and height of the neighboring block need to be accessed in order to check whether the current block and the neighboring block use the same matrix set. This MPM list generation process is complicated and can be simplified.

In addition, to signal a non-ALWIP intra prediction mode, when a neighboring block is coded using an ALWIP mode, one look-up table is used to map the ALWIP mode of the neighboring block to a non-ALWIP intra prediction mode. However, it may not be necessary to convert an ALWIP mode to a non-ALWIP mode for a neighboring block.

Further, ALWIP mode is not applied for intra prediction of a chroma block, however, when derived mode is used for the chroma block and a co-located luma block of the chroma block is coded using an ALWIP mode, the ALWIP mode of the co-located luma block needs to be converted to a non-ALWIP intra prediction mode. This process is complicated and can also be simplified.

Aspects of the disclosure provide simplified signaling for ALWIP and non-ALWIP modes. The embodiments may be used separately or combined in any order.

According to aspects of the disclosure, the signaling and/or reconstruction of an ALWIP mode index for a current block is performed without checking intra prediction mode(s) of neighboring block(s) of the current block. In an embodiment, the signaling and/or reconstruction can be performed without checking intra prediction modes of any neighboring blocks of the current block. For example, with reference back to FIG. 10, the neighboring blocks can be the left neighboring block A and the above neighboring blocks B. The left neighboring block A is adjacent to the bottom-left corner of the current block and the above neighboring block B is adjacent to the top-right corner of the current block. In such an example, the signaling and/or reconstruction can be performed without checking intra prediction modes of the left neighboring block A and the above neighboring block B.

In an embodiment, an ALWIP mode index is directly signaled. The ALWIP mode index can be directly signaled using a codeword such as a truncated binary codeword, a fixed length codeword, or a truncated unary codeword. For example, an ALWIP mode index is signaled using a 5-bit fixed-length codeword. In another example, a subset of ALWIP modes, e.g., K1 ALWIP modes, are signaled using an M1-bit fixed-length codeword, while the remaining ALWIP modes are signaled using an M2-bit fixed-length codeword. K1, M1, and M2 are non-negative integers in the above examples.

In an embodiment, an ALWIP mode index is signaled without constructing an MPM list or signaling of an MPM flag. For example, a codeword such as a truncated binary codeword or a fixed-length codeword is employed to signal an ALWIP mode index.

In an embodiment, when a current block is coded by ALWIP, mode candidates in an MPM list of the current block are fixed, regardless of intra prediction mode(s) of neighboring block(s) of the current block. In such an embodiment, the positions of the neighboring blocks can be the same as those used for prediction in non-ALWIP modes (e.g., the neighboring blocks A and B in FIG. 10). In an example, when a current block is coded by ALWIP, both the mode candidates in an MPM list of the current block and an order of the mode candidates are fixed, regardless of the intra prediction mode(s) of the neighboring block(s) of the current block. In such an example, the positions of the neighboring blocks can be the same as those used for prediction in a non-ALWIP mode (e.g., the neighboring blocks A and B in FIG. 10). In another example, when a current block is coded by ALWIP, mode candidates and/or an order of the mode candidates in an MPM list of the current block depend on a width and/or a height of the current block. The mode candidates and/or an order of the mode candidates in an MPM list of the current block can only depend on the width and/or the height of the current block in some embodiments.

According to some embodiments, a total number of ALWIP modes is a power of 2, such as $N=2^k$, where N is the total number of ALWIP modes. K is a non-negative integer, such as one of 0 through 5 and so on.

In an embodiment, the value of K is dependent on a block size of the current block. For example, the block size of the current block can be denoted by (i) a block width, (ii) a block height, (iii) an average of the block width and the block height, (iv) a minimum of the block width and the block height, (v) a maximum of the block width and the block height, (vi) a block area size, or (vii) a block aspect ratio.

According to aspects of the disclosure, when constructing an MPM list of a current block that is coded using a non-ALWIP infra prediction mode, a prediction mode of one or more neighboring blocks of the current block is marked as unavailable or a fixed mode when the prediction mode of the neighboring block is an ALWIP mode. In an example, the position of the one or more neighboring blocks can be the same as those used for prediction in other non-ALWIP modes (e.g., the neighboring blocks A and B in FIG. 10). In an embodiment, when constructing an MPM list of a current block that is coded using a non-ALWIP intra prediction mode, a prediction mode of the one or more neighboring blocks of the current block is marked as Planar intra prediction mode. In an embodiment, when constructing an MPM list of a current block that is coded using a non-ALWIP intra prediction mode, a prediction mode of the one or more neighboring blocks of the current block is marked as DC intra prediction mode. In an embodiment, when constructing an MPM list of a current block that is coded using a non-intra prediction mode, a prediction mode of a neighboring block of the current block is marked as one of Planar, DC, Horizontal, or Vertical intra prediction mode.

According to aspects of the disclosure, for constructing an MPM list of a current block that is coded using an ALWIP mode, a prediction mode of one or more neighboring blocks of the current block is marked as available or a default ALWIP mode. In an embodiment, when the neighboring block is coded by ALWIP, its prediction mode is marked as available, or when the neighboring block is coded by non ALWIP, its prediction mode is marked as a default ALWIP mode.

In an embodiment, when a current block is coded by ALWIP, for constructing an MPM list of the current block, a prediction mode of a neighboring block is converted to an ALWIP prediction mode when the prediction mode is a non-ALWIP mode. For example, the prediction mode is converted to an ALWIP prediction mode with a mode index k, Where the value of k is a non-negative integer and is not permitted to exceed a maximum allowed mode index number of an ALWIP mode.

In an embodiment, when a current block is coded by ALWIP, for constructing an MPM list of the current block, a prediction mode of a neighboring block of the current block is marked as unavailable when the prediction mode is not an ALWIP mode.

In an embodiment, when a current block is coded by ALWIP, a size of MPM list is set to 1. An intra prediction mode of a left (or an above) neighboring block can be inserted into the MPM list when the intra prediction mode is an ALWIP mode. When both the left and the above neighboring blocks are coded by non-ALWIP, one default ALWIP mode is inserted into the MPM list. In an example, the default ALWIP mode is fixed, regardless of a block size of the current block. In an example, the default ALWIP mode is set to Planar mode (e.g., mode 0).

In an embodiment, when a current block is coded by ALWIP, a size of MPM list is set to 2. An intra prediction mode of a left (or an above) neighboring block can be inserted into the MPM list when the intra prediction mode is an ALWIP mode. When the left (or the above) neighboring block is coded using a non-ALWIP mode, a default ALWIP mode is inserted into the MPM list. In an example, the default ALWIP mode is fixed, regardless of a block size of the current block. In an example, when an MPM flag indicates that an intra prediction mode of the current block is from the MPM list, e.g., the MPM flag is true, another flag is signaled to indicate which MPM candidate in the MPM list is selected for the current block.

According to aspects of the disclosure, a position of a neighboring block used for deriving the MPM list of an ALWIP mode is the same with that for a non-ALWIP mode. In an embodiment, for an ALWIP mode, the position(s) of the neighboring block(s) used for deriving the MPM list is adjacent to a top-right corner or a bottom-left corner of the current block, as shown in FIG. 10.

According to aspects of the disclosure, a size of an MPM list for an ALWIP mode is dependent on coded information, for example included in the coded video sequence. The coded information can include, but is not limited to, one or more of an intra prediction mode of one or more neighboring blocks, a reference line index of the one or more neighboring blocks, an ALWIP flag of the one or more neighboring blocks.

In an embodiment, when a current block is coded by ALWIP and both the top-right and bottom-left neighboring blocks are coded by non-ALWIP, an MPM list is not constructed and an ALWIP mode index is directly signaled for the current block.

In an embodiment, when a current block is coded by ALWIP, and at least one of the neighboring blocks of the current block is coded by ALWIP, a size of an MPM list for the current block is set to a non-negative integer, such as 1 or 2.

According to aspects of the disclosure, ALWIP is not applied on a chroma block. Therefore, when an associated luma block (e.g., a co-located luma block) of a current chroma block is coded by ALWIP and a derived mode is used for the current chroma block, a default non-ALWIP mode is used for the current chroma block. In one embodiment, the default non-ALWIP mode is Planar mode. In another embodiment, the default non-ALWIP mode is DC mode.

According to aspects of the disclosure, when a current chroma block is associated with multiple luma blocks, e.g., the current chroma block is associated with multiple co-located luma blocks, and a derived mode is used for the current block, the multiple luma blocks are checked to determine whether one of the multiple associated luma blocks is coded by a non-ALWIP intra prediction mode.

In an embodiment, when one of the multiple associated luma blocks is determined to be coded by a non-ALWIP intra prediction mode, the non-ALWIP intra prediction mode is used as the intra prediction mode of the current chroma block.

In an embodiment, when none of the multiple associated luma blocks (e.g., co-located luma blocks) is coded by a non-ALWIP intra prediction mode, a default non-ALWIP intra prediction mode is used as the intra prediction mode of the current chroma blocks.

Figure 13:
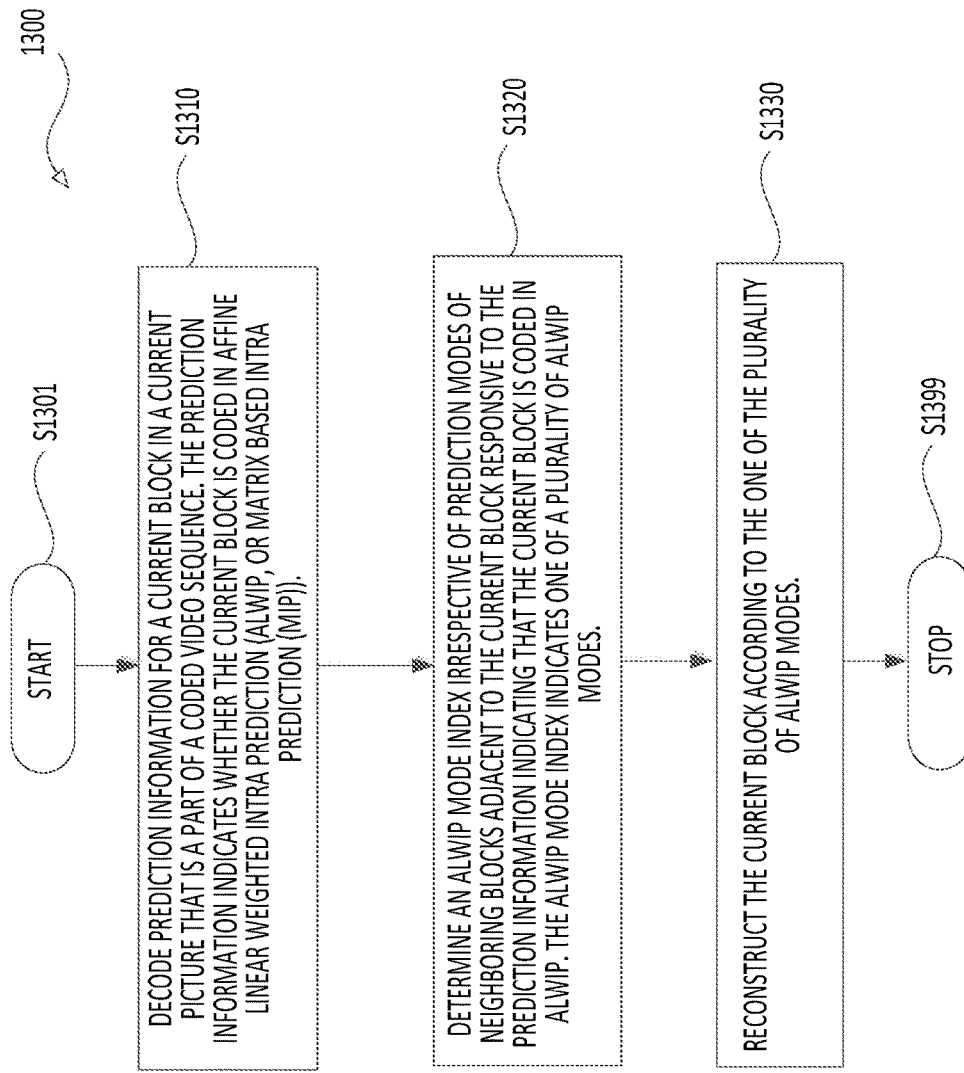
FIG. 13 shows a flow chart outlining a process example according to some embodiments.

FIG. 13 shows a flow chart outlining a process (1300) according to an embodiment of the disclosure. The process (1300) can be used in the reconstruction of a block coded in intra mode, so to generate a prediction block for the block under reconstruction. In various embodiments, the process (1300) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1300) is implemented in software instructions, thus when the processing circuitry executes the software instructions, the processing circuitry performs the process (1300). The process starts at (S1301) and proceeds to (S1310).

At step (S1310), the process (1300) decodes prediction information for a current block in a current picture that is a part of a coded video sequence. The prediction information indicates whether the current block is coded in acne linear weighted intra prediction (ALWIP). Responsive to the prediction information indicating that the current block is coded in ALWIP, the process (1300) proceeds to step (S1320).

At step (S1320), the process (1300) determines an ALWIP mode index irrespective of prediction modes of neighboring blocks adjacent to the current block. The ALWIP mode index indicates one of a plurality of ALWIP modes. Then the process (1300) proceeds to step (S1330).

At step (S1330), the process (1300) reconstructs the current block according to the one of the plurality of ALWIP modes. Then, the process (1300) proceeds to (S1399) and terminates.

In an embodiment, the ALWIP mode index is one of a truncated binary codeword, a fixed length codeword, and a truncated unary codeword.

In an embodiment, responsive to the prediction information indicating that the current block is coded in ALWIP, the process (1300) constructs a mode candidate list including at least one fixed mode candidate. The at least one fixed mode candidate is a predetermined subset of the plurality of ALWIP modes.

In an embodiment, a total number of the plurality of ALWIP modes is a power of 2.

In an embodiment, responsive to the prediction information indicating that the current block is not coded in ALWIP, the process (1300) determines whether one of the neighboring blocks is coded in ALWIP. Responsive to the one of the neighboring blocks being coded in ALWIP, the process (1300) constructs the mode candidate list based on one of (i) a preset intra prediction mode and (ii) an intra prediction mode of another neighboring block of the neighboring blocks.

In an embodiment, the preset prediction mode is one of a Planar intra prediction mode, a DC intra prediction mode, a Horizontal intra prediction mode, and a Vertical intra prediction mode.

In an embodiment, the process (1300) sets the one of the neighboring blocks as unavailable responsive to the one of the neighboring blocks being coded in ALWIP.

In an embodiment, responsive to the prediction information indicating that the current block is coded in ALWIP and a derived mode being used for an associated chroma block of the current block, the process (1300) sets a prediction mode of the associated chroma block to be a preset intra prediction mode.

Figure 14:
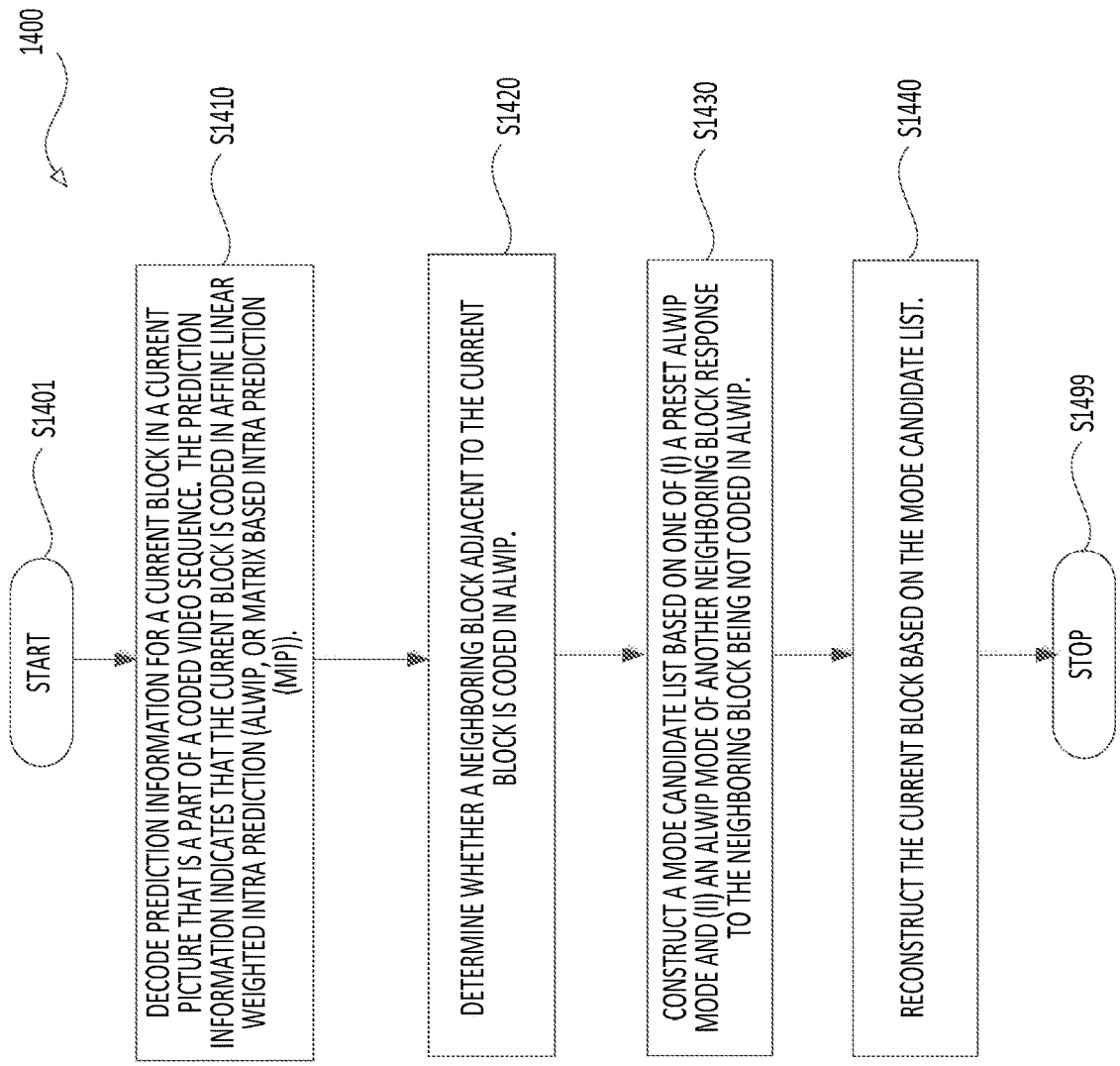
FIG. 14 shows a flow chart outlining another process example according to some embodiments.

FIG. 14 shows a flow chart outlining a process (1400) according to an embodiment of the disclosure. The process (1400) can be used in the reconstruction of a block coded in intra mode, so to generate a prediction block for the block under reconstruction. In various embodiments, the process (1400) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1400) is implemented in software instructions, thus when the processing circuitry executes the software instructions, the processing circuitry performs the process (1400). The process starts at (S1401) and proceeds to (S1410).

At step (S1410), the process (1400) decodes prediction information for a current block in a current picture that is a part of a coded video sequence. The prediction information indicates that the current block is coded in affine linear weighted intra prediction (ALWIP). Then the process (1400) proceeds to step (S1420).

At step (S1420), the process (1400) determines whether a neighboring block adjacent to the current block is coded in ALWIP. Responsive to the neighboring block not being coded in ALWIP, the process (1400) proceeds to step (S1430).

At step (S1430), the process (1400) constructs a mode candidate list based on one of (i) a preset ALWIP mode and (ii) an ALWIP mode of another neighboring block. Then the process (1400) proceeds to step (S1440).

At step (S1440), the process (1400) reconstructs the current block based on the mode candidate list. Then, the process (1400) proceeds to (S1499) and terminates.

In an embodiment, the process (1400) sets the neighboring block as unavailable responsive to the neighboring block not being coded in ALWIP.

In an embodiment, the neighboring block is adjacent to a top-right corner or a bottom-left corner of the current block.

In an embodiment, a size of the mode candidate list is based on coded information of the neighboring block included in the coded video sequence.

In an embodiment, the prediction information indicates that a chroma block of the current block is associated with multiple luma blocks, and the process (1400) determines whether a luma block of the multiple luma blocks is coded in a non-ALWIP intra prediction mode. Responsive to the luma block being coded in the non-ALWIP intra prediction mode, the process (1400) determines a prediction mode of the chroma block of the current block to be the non-ALWIP intra prediction mode of the luma block In an embodiment, the prediction information indicates that a chroma block of the current block is associated with multiple luma blocks, and the process (1400) determines whether a luma block of the multiple luma blocks is coded in a non-ALWIP intra prediction mode. Responsive to each of the multiple luma blocks being coded in ALWIP, the process (1400) determines the prediction mode of the chroma block of the current block to be a preset intra prediction mode.

Computer System

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
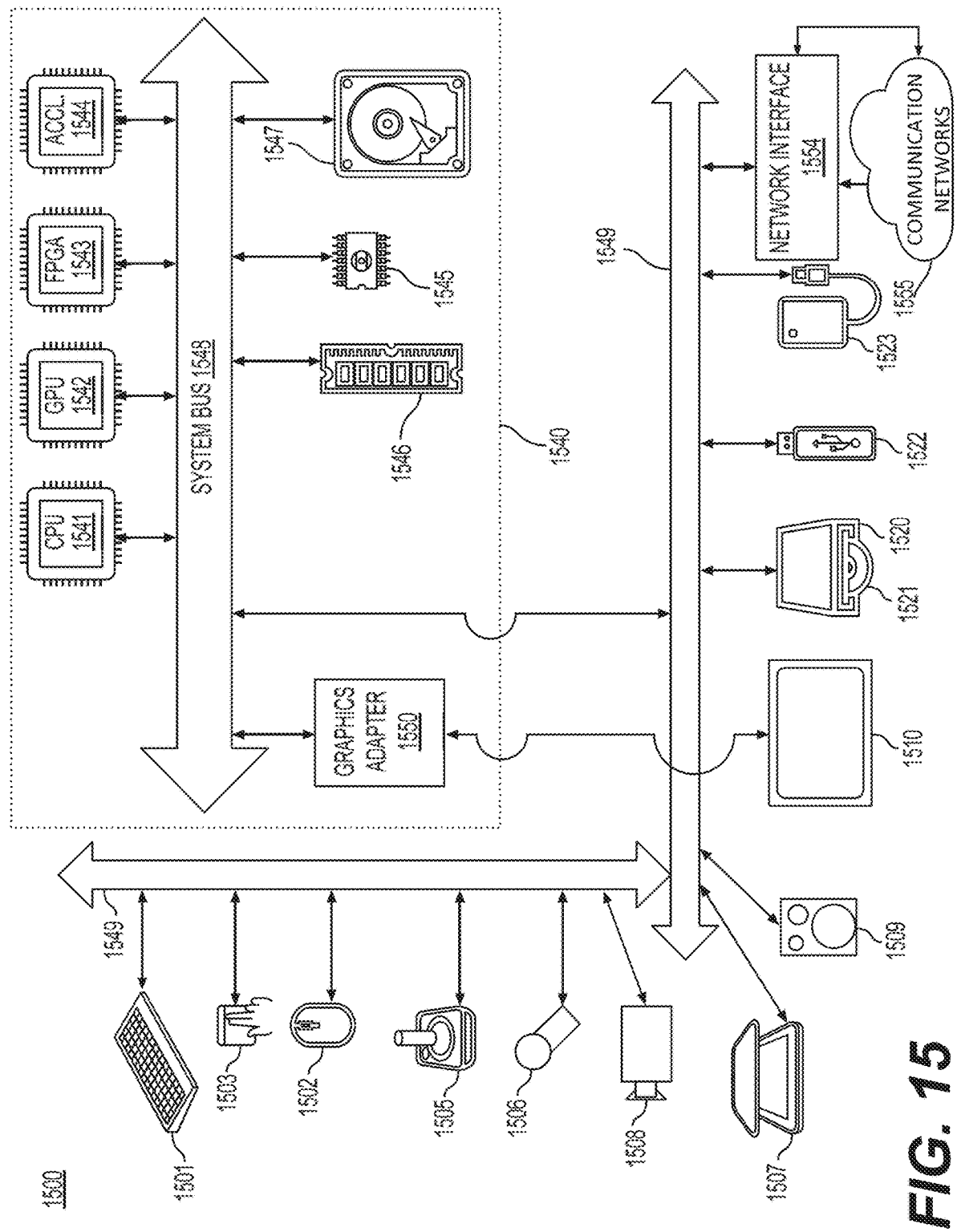
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1510)) can be connected to a system bus (1548) through a graphics adapter (1550).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include a network interface (1554) to one or more communication networks (1555). The one or more communication networks (1555) can for example be wireless, wireline, optical. The one or more communication networks (1555) can further be local, wide-area, metropolitan, vehicular and industrial, real-time, delay-tolerant, and so on. Examples of the one or more communication networks (1555) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be unidirectional, receive only (for example, broadcast TV), unidirectional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through the system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

ALWIP (or LWIP): Milne Linear Weighted Intra Prediction
AMVP: Advanced Motion Vector Prediction
ASIC: Application-Specific Integrated Circuit
AMVP: Alternative/Advanced Temporal Motion Vector Prediction
BMS: Benchmark Set
BV: Block Vector
CANBus: Controller Area Network Bus
CB: Coding Block
CD: Compact Disc
CPR: Current Picture Referencing
CPUs: Central Processing Units
CRT: Cathode Ray Tube
CTBs: Coding Tree Blocks
CTUs: Coding Tree Units
CU: Coding Unit
DM: Derived Mode
DPB: Decoder Picture Buffer
DVD: Digital Video Disc
FPGA: Field Programmable Gate Areas
GOPs: Groups of Pictures
GPUs: Graphics Processing Units
GSM: Global System for Mobile communications
HDR: High Dynamic Range
HEVC: High Efficiency Video Coding
HRD: Hypothetical Reference Decoder
IBC: Intra Block Copy
IC: Integrated Circuit
ISP: Intra Sub-Partition
JEM: Joint Exploration Model
JVET: Joint Video Exploration Team
LAN: Local Area Network
LCD: Liquid-Crystal Display
LTE: Long-Term Evolution
MIP: Matrix-based Intra Prediction
MPM: Most Probable Mode
MV: Motion Vector
OLED: Organic Light-Emitting Diode
PBs: Prediction Blocks
PCI: Peripheral Component Interconnect
PDPC: Position Dependent Prediction Combination
PLD: Programmable Logic Device
PU: Prediction Unit
RAM: Random Access Memory
ROM: Read-Only Memory
SCC: Screen Content Coding
SDR: Standard Dynamic Range
SEI: Supplementary Enhancement Information
SNR: Signal Noise Ratio
SSD: Solid-state Drive
TUs: Transform Units
USB: Universal Serial Bus
VUI: Video Usability Information
VVC: Versatile Video Coding
WAIP: Wide-Angle Intra Prediction

What is claimed is:

1. A method for video decoding in a decoder, comprising:
decoding prediction information for a current block in a current picture that is a part of a coded video sequence, the prediction information indicating whether the current block is coded in matrix based intra prediction (MIP);
responsive to the prediction information indicating that the current block is coded in MIP,
determining an MIP mode index, the MIP mode index indicating one of a plurality of MIP modes;
responsive to the current block not being coded in MIP and one of a plurality of neighboring blocks being coded in MIP, determining an intra prediction candidate mode for the current block to be a Planar intra prediction mode; and reconstructing the current block according to (i) the one of the plurality of MIP modes when the prediction information indicates that the current block is coded in MIP and (ii) the Planar intra prediction mode when the prediction information indicates the current block is not coded in MIP and the one of the plurality of neighboring blocks is coded in MIP.

2. The method of claim 1, wherein the MIP mode index is one of a truncated binary codeword, a fixed length codeword, and a truncated unary codeword.

3. The method of claim 1, further comprising:
responsive to the prediction information indicating that the current block is coded in MIP,
constructing a mode candidate list including at least one fixed mode candidate, the at least one fixed mode candidate being a predetermined subset of the plurality of MIP modes.

4. The method of claim 1, wherein a total number of the plurality of MIP modes is a power of 2.

5. The method of claim 1, further comprising:
responsive to the prediction information indicating that the current block is not coded in MIP and the one of the plurality of neighboring blocks being coded in MIP,
constructing a mode candidate list based on one of (i) a preset intra prediction mode and (ii) an intra prediction mode of another neighboring block of the neighboring blocks, the mode candidate list including the Planar intra prediction mode.

6. The method of claim 5, wherein the preset intra prediction mode is one of a Planar intra prediction mode, a DC intra prediction mode, a Horizontal intra prediction mode, and a Vertical intra prediction mode.

7. The method of claim 5, wherein the constructing further comprises:
setting the one of the plurality of neighboring blocks as unavailable.

8. The method of claim 1, further comprising:
responsive to the prediction information indicating that the current block is coded in MIP and a derived mode being used for an associated chroma block of the current block,
setting a prediction mode of the associated chroma block to be a preset intra prediction mode.

9. A method for video decoding in a decoder, comprising:
decoding prediction information for a current block in a current picture that is a part of a coded video sequence, the prediction information indicating that the current block is coded in matrix based intra prediction (MIP);
determining whether a neighboring block adjacent to the current block is coded in MIP;
responsive to the neighboring block not being coded in MIP,
constructing a mode candidate list based on one of (i) a preset MIP mode and (ii) an MIP mode of another neighboring block; and
reconstructing the current block based on the mode candidate list.

10. The method of claim 9, wherein the constructing further comprises:
responsive to the neighboring block not being coded in MIP,
setting the neighboring block as unavailable.

11. The method of claim 9, wherein the neighboring block is adjacent to a top-right corner or a bottom-left corner of the current block.

12. The method of claim 9, wherein a size of the mode candidate list is based on coded information of the neighboring block included in the coded video sequence.

13. The method of claim 9, wherein the prediction information indicates that a chroma block of the current block is associated with multiple luma blocks, the method further comprises:
determining whether a luma block of the multiple luma blocks is coded in a non-MIP intra prediction mode; and
responsive to the luma block being coded in the non-MIP intra prediction mode,
determining a prediction mode of the chroma block of the current block to be the non-ALWIP intra prediction mode of the luma block.

14. The method of claim 13, further comprising:
responsive to each of the multiple luma blocks being coded in MIP,
determining the prediction mode of the chroma block of the current block to be a preset intra prediction mode.

15. An apparatus, comprising a processing circuitry configured to:
decode prediction information for a current block in a current picture that is a part of a coded video sequence, the prediction information indicating whether the current block is coded in matrix based intra prediction (MIP);
responsive to the prediction information indicating that the current block is coded in MIP,
determine an MIP mode index, the MIP mode index indicating one of a plurality of MIP modes;
responsive to the current block not being coded in MIP and one of a plurality of neighboring blocks being coded in MIP,
determine an intra prediction candidate mode for the current block to be a Planar intra prediction mode; and
reconstruct the current block according to (i) the one of the plurality of MIP modes when the prediction information indicates that the current block is coded in MIP and (ii) the Planar intra prediction mode when the prediction information indicates the current block is not coded in MIP and the one of the plurality of neighboring blocks is coded in MIP.

16. The apparatus of claim 15, wherein the MIP mode index is one of a truncated binary codeword, a fixed length codeword, and a truncated unary codeword.

17. An apparatus, comprising a processing circuitry configured to:
decode prediction information for a current block in a current picture that is a part of a coded video sequence, the prediction information indicating that the current block is coded in matrix based intra prediction (MIP);
determine whether a neighboring block adjacent to the current block is coded in MIP;
responsive to the neighboring block not being coded in MIP,
construct a mode candidate list based on one of (i) a preset MIP mode and (ii) an MIP mode of another neighboring block; and
reconstruct the current block based on the mode candidate list.

18. The apparatus of claim 17, wherein the processing circuitry is further configured to:
  responsive to the neighboring block not being coded in MIP,
    set the neighboring block as unavailable.

19. A non-transitory computer-readable storage medium storing a program executable by at least one processor to perform:
  decoding prediction information for a current block in a current picture that is a part of a coded video sequence, the prediction information indicating whether the current block is coded in matrix based intra prediction (MIP);
  responsive to the prediction information indicating that the current block is coded in MIP,
    determining an MIP mode index, the MIP mode index indicating one of a plurality of MIP modes;
  responsive to the current block not being coded in MIP and one of a plurality of neighboring blocks being coded in MIP,
    determining an intra prediction candidate mode for the current block to be a Planar intra prediction mode; and
  reconstructing the current block according to (i) the one of the plurality of MIP modes when the prediction information indicates that the current block is coded in MIP and (ii) the Planar intra prediction mode when the prediction information indicates the current block is not coded in MIP and the one of the plurality of neighboring blocks is coded in MIP.

20. A non-transitory computer-readable storage medium storing a program executable by at least one processor to perform:
  decoding prediction information for a current block in a current picture that is a part of a coded video sequence, the prediction information indicating that the current block is coded in matrix based intra prediction (MIP);
  determining whether a neighboring block adjacent to the current block is coded in MIP;
  responsive to the neighboring block not being coded in MIP,
    constructing a mode candidate list based on one of (i) a preset MIP mode and (ii) an MIP mode of another neighboring block; and
  reconstructing the current block based on the mode candidate list.

* * * * *